(12) United States Patent
Lawrence et al.

(10) Patent No.: US 11,134,114 B2
(45) Date of Patent: Sep. 28, 2021

(54) USER INPUT BASED ADAPTIVE STREAMING

(71) Applicant: INTEL CORPORATION, Santa Clara, CA (US)

(72) Inventors: Sean J. Lawrence, Bangalore (IN); Raghavendra Angadimani, Bangalore (IN); Nishant Kamat, Bangalore (IN); Rohit K. Choraria, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 934 days.

(21) Appl. No.: 15/070,732

(22) Filed: Mar. 15, 2016

(65) Prior Publication Data

US 2017/0272487 A1 Sep. 21, 2017

(51) Int. Cl.
*H04L 29/06* (2006.01)
*H04W 4/80* (2018.01)

(52) U.S. Cl.
CPC ........ *H04L 65/602* (2013.01); *H04L 65/4069* (2013.01); *H04L 65/80* (2013.01); *H04W 4/80* (2018.02)

(58) Field of Classification Search
CPC combination set(s) only.
See application file for complete search history.

(56) References Cited

U.S. PATENT DOCUMENTS

| | | | | |
|---|---|---|---|---|
| 2010/0050222 A1* | 2/2010 | Legallais | ................ | H04N 7/16 725/112 |
| 2011/0119716 A1* | 5/2011 | Coleman, Sr. | ......... | H04N 7/181 725/62 |
| 2011/0191676 A1* | 8/2011 | Guttman | ................... | G06F 3/00 715/716 |
| 2012/0289290 A1* | 11/2012 | Chae | ...................... | G06F 3/0488 455/566 |
| 2013/0047189 A1* | 2/2013 | Raveendran | ........... | H04N 21/23 725/81 |
| 2013/0222210 A1* | 8/2013 | Wang | ................. | H04N 21/4307 345/2.3 |
| 2013/0304794 A1* | 11/2013 | Verma | ..................... | G06F 3/038 709/201 |
| 2014/0172478 A1* | 6/2014 | Vadasz | .......... | G06Q 10/063114 705/7.15 |
| 2014/0331263 A1 | 11/2014 | Smadi et al. | | |
| 2014/0334381 A1* | 11/2014 | Subramaniam | .... | H04N 21/4316 370/328 |
| 2015/0067186 A1 | 3/2015 | Kuhn | | |

(Continued)

OTHER PUBLICATIONS

International Search Report and Written Opinion for International PCT Application Serial No. PCT/US2017/014875 filed Jan. 25, 2017, dated Apr. 14, 2017, 15 pages.

*Primary Examiner* — Tonia L Dollinger
*Assistant Examiner* — Joseph M Cousins
(74) *Attorney, Agent, or Firm* — Hanley, Flight & Zimmerman, LLC

(57) ABSTRACT

An apparatus for user input based adaptive streaming is described herein. The apparatus includes a controller to configure a plurality of audio/video streaming parameters based on user input. The apparatus also includes an adaptive module to apply the plurality of audio/video streaming parameters to a stream of audio/video data in response to the user input.

22 Claims, 6 Drawing Sheets

(56) References Cited

U.S. PATENT DOCUMENTS

| | | | |
|---|---|---|---|
| 2015/0296460 A1* | 10/2015 | Lee | H04B 1/3838 |
| | | | 455/522 |
| 2015/0339244 A1 | 11/2015 | Lee et al. | |
| 2016/0353425 A1* | 12/2016 | Iwami | H04W 72/0406 |
| 2018/0048679 A1* | 2/2018 | Huang | H04L 65/00 |
| 2018/0367836 A1* | 12/2018 | Shikhare | H04N 21/42203 |

* cited by examiner

USER INPUT BASED ADAPTIVE STREAMING

BACKGROUND ART

A personal area network (PAN) can be used for communication between a plurality of computing devices or for connecting to a higher level network, such as a local area network (LAN) or the Internet. In some cases, the plurality of computing devices are personal computing devices, such as laptops, mobile devices, tablets, phablet and the like.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
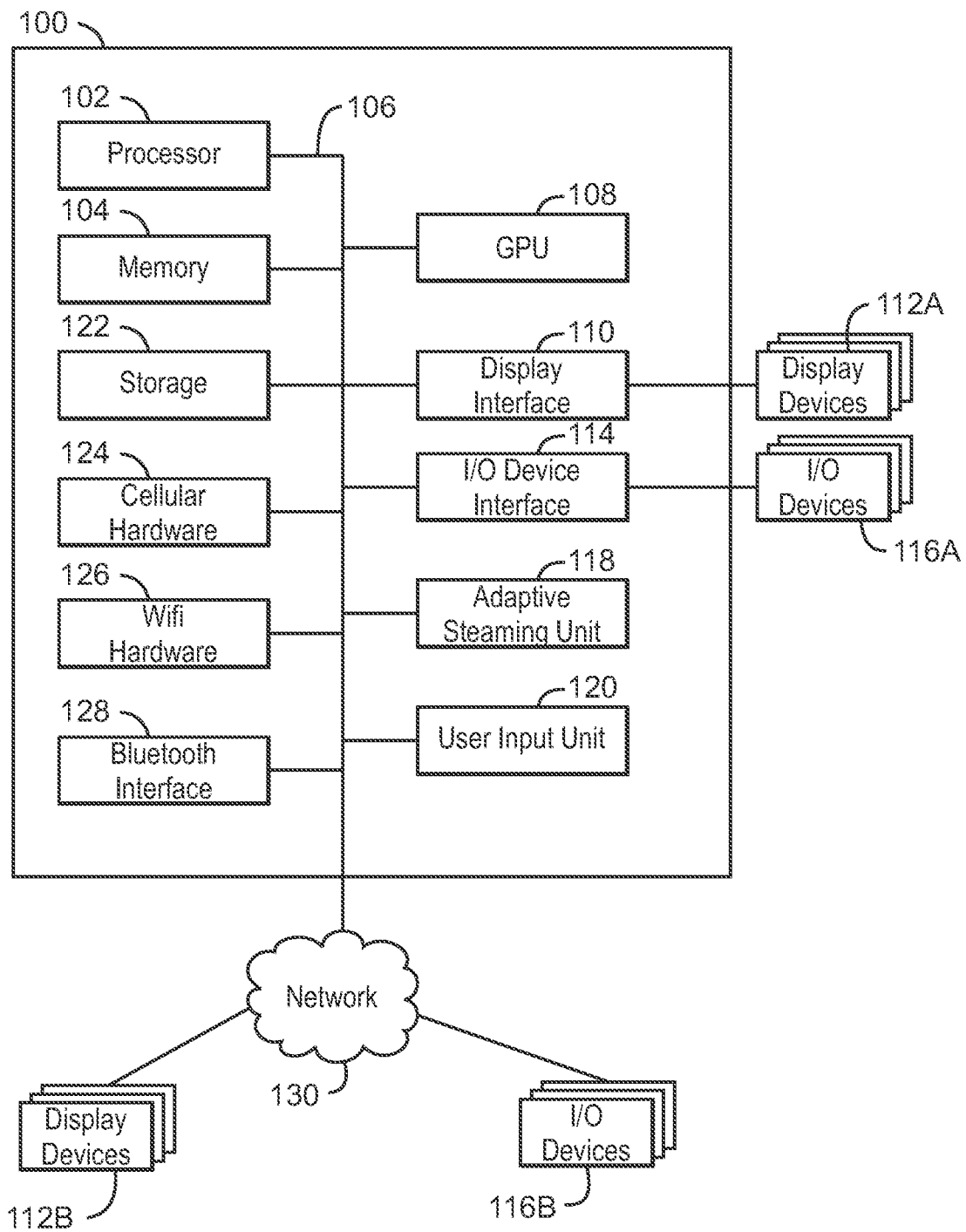
FIG. 1 is a block diagram of an exemplary system for user input adaptive streaming.

A PAN can be used for streaming audio and video (AV) data from one device to another device, such as a desktop computer, television, or a display. The PAN can stream AV data in real time between devices that access the PAN. Real time PAN AV streaming solutions include, but are not limited to Wireless Display (WiDi) and Miracast. However, the present techniques are not limited to WIDI and Miracast. The present techniques may be applied to any system that may have multiple modes of streaming that may be determined by any form of user input. This includes, but is not limited to, web based applications, wired or wireless head mounted displays (HMDs), and the like.

Real time PAN AV streaming solutions include at least two modes based on the selected usage scenario. For example, a first mode where a user is interacting with the computing devices typically includes AV encoding parameters that are modified to suit interactive scenarios and use cases. This first mode may be referred to as a low latency mode. A second mode where AV encoding parameters are modified such that the quality of the AV stream is the best or reasonably good may be referred to as a quality mode. In embodiments, the second mode may be best when compared to the first mode. Additionally, in embodiments, the second mode may have any one of a higher latency, higher bitrate, a higher resolution, or any combination thereof, when compared to the first mode. Switching between these two modes is done via a manual option where the user can change modes as necessary. In particular, the two modes may be modes as defined as according to Intel Wireless Display (WIDI).

Some real time PAN AV streaming solutions switches to quality mode only when movies are played over full screen. At other times the stream mode is tuned to interactive usage. Interactive and Quality modes are generally mutually exclusive where interactive streaming configuration demands low latency, low bitrate, lower resolution and hence lower quality streaming. With quality streaming configuration, higher latency is not an issue enabling the bandwidth for a higher bitrate and resolution, and resulting in a better AV quality.

Embodiments described herein enable user input based adaptive steaming. In embodiments, the present techniques enable an automatic change in streaming modes based on if the user is interacting with the system. In embodiments, the switch occurs between quality and interactive modes. Additionally, in embodiments, the user input is used to modify of other parameters on the transmitter and receiver. In embodiments, the streaming modes are changed automatically, in real time.

Some embodiments may be implemented in one or a combination of hardware, firmware, and software. Further, some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

FIG. 1 is a block diagram of an exemplary system for user input adaptive streaming. Adaptive streaming may be applied to a plurality of modes, such as interactive and quality modes. The electronic device 100 may be, for example, a laptop computer, tablet computer, mobile phone, smart phone, or a wearable device, among others. The electronic device may be used to connect to a PAN as described above. The electronic device 100 may include a central processing unit (CPU) 102 that is configured to execute stored instructions, as well as a memory device 104 that stores instructions that are executable by the CPU 102. The CPU may be coupled to the memory device 104 by a bus 106. Additionally, the CPU 102 can be a single core processor, a multi-core processor, a computing cluster, or any number of other configurations. Furthermore, the electronic device 100 may include more than one CPU 102. The memory device 104 can include random access memory (RAM), read only memory (ROM), flash memory, or any other suitable memory systems. For example, the memory device 104 may include dynamic random access memory (DRAM).

The electronic device 100 also includes a graphics processing unit (GPU) 108. As shown, the CPU 102 can be coupled through the bus 106 to the GPU 108. The GPU 108 can be configured to perform any number of graphics operations within the electronic device 100. For example, the GPU 108 can be configured to render or manipulate graphics images, graphics frames, videos, or the like, to be displayed to a user of the electronic device 100. In some embodiments, the GPU 108 includes a number of graphics engines, wherein each graphics engine is configured to perform specific graphics tasks, or to execute specific types of workloads.

The CPU 102 can be linked through the bus 106 to a display interface 110 configured to connect the electronic device 100 to one or more display devices 112A. The display devices 112 can include a display screen that is a built-in component of the electronic device 100. In embodiments, the display interface 110 is coupled with the display devices 112B via any networking technology such as cellular hardware 124, Wifi hardware 126, or Bluetooth Interface 128 across the network 130. The display devices 112B can also include a computer monitor, television, or projector, among others, that is externally connected to the electronic device 100.

The CPU 102 can also be connected through the bus 106 to an input/output (I/O) device interface 114 configured to connect the electronic device 100 to one or more I/O devices 116A. The I/O devices 116A can include, for example, a keyboard and a pointing device, wherein the pointing device can include a touchpad or a touchscreen, among others. The I/O devices 116A can be built-in components of the electronic device 100, or can be devices that are externally connected to the electronic device 100. Accordingly, in embodiments, the I/O device interface 114 is coupled with the I/O devices 116B via any networking technology such as cellular hardware 124, Wifi hardware 126, or Bluetooth Interface 128 across the network 130. The I/O devices 116B can also include any I/O device that is externally connected to the electronic device 100.

The electronic device 100 also includes an adaptive streaming unit 118. The adaptive streaming unit is to modify transmission and reception parameters based on user input. The user input unit may be used to capture any user input. The user input unit may include data from input devices such as a keyboard, mouse, touchscreen, sensors, and the like.

The storage device 122 is a physical memory such as a hard drive, an optical drive, a flash drive, an array of drives, or any combinations thereof. The storage device 122 can store user data, such as audio files, video files, audio/video files, and picture files, among others. The storage device 122 can also store programming code such as device drivers, software applications, operating systems, and the like. The programming code stored to the storage device 122 may be executed by the CPU 102, GPU 108, or any other processors that may be included in the electronic device 100.

The CPU 102 may be linked through the bus 106 to cellular hardware 124. The cellular hardware 124 may be any cellular technology, for example, the 4G standard (International Mobile Telecommunications-Advanced (IMT-Advanced) Standard promulgated by the International Telecommunications Union-Radio communication Sector (ITU-R)). In this manner, the PC 100 may access any network 130 without being tethered or paired to another device, where the network 130 is a cellular network.

The CPU 102 may also be linked through the bus 106 to WiFi hardware 126. The WiFi hardware 126 is hardware according to WiFi standards (standards promulgated as Institute of Electrical and Electronics Engineers' (IEEE) 802.11 standards). The WiFi hardware 126 enables the wearable electronic device 100 to connect to the Internet using the Transmission Control Protocol and the Internet Protocol (TCP/IP), where the network 130 is the Internet. Accordingly, the wearable electronic device 100 can enable end-to-end connectivity with the Internet by addressing, routing, transmitting, and receiving data according to the TCP/IP protocol without the use of another device. Additionally, a Bluetooth Interface 128 may be coupled to the CPU 102 through the bus 106. The Bluetooth Interface 128 is an interface according to Bluetooth networks (based on the Bluetooth standard promulgated by the Bluetooth Special Interest Group). The Bluetooth Interface 128 enables the wearable electronic device 100 to be paired with other Bluetooth enabled devices through a personal area network (PAN). Accordingly, the network 130 may be a PAN. Examples of Bluetooth enabled devices include a laptop computer, desktop computer, ultrabook, tablet computer, mobile device, or server, among others.

The block diagram of FIG. 1 is not intended to indicate that the electronic device 100 is to include all of the components shown in FIG. 1. Rather, the computing system 100 can include fewer or additional components not illustrated in FIG. 1 (e.g., sensors, power management integrated circuits, additional network interfaces, etc.). The electronic device 100 may include any number of additional components not shown in FIG. 1, depending on the details of the specific implementation. Furthermore, any of the functionalities of the CPU 102 may be partially, or entirely, implemented in hardware and/or in a processor. For example, the functionality may be implemented with an application specific integrated circuit, in logic implemented in a processor, in logic implemented in a specialized graphics processing unit, or in any other device.

As used herein, streaming parameters include parameters that specify characteristics of data to be sent to another device connected to the PAN. In embodiments, the streaming parameters can specify the latency, bitrate, and resolution of data to be streamed across the PAN. Additionally, the streaming parameters can indicate the encoding to be applied to data to be streamed across the PAN. The streaming parameters may be modified based on the user interaction and intensity of interaction. For example, keyboard and mouse input would indicate to the system that the streaming parameters need to be set such that response is prioritized with lowered latency with utmost importance. As used herein, the intensity of interaction describes a quantity associated with the interaction, as well as the nature of the interaction. For example, in the case of a keyboard, the intensity of interaction may be defined by the number of keystrokes per second. The intensity of interaction may also be defined by how often keystrokes occur during a larger timeframe. Additionally, the intensity of interaction may refer to an amount of data transmitted as a result of the user interaction. The amount of data may be greater than a pre-defined threshold, resulting in a change in modes. In embodiments, a marker may be added in the frames metadata to mark if the frame contains user interaction. Based on this information, receivers can modify the display settings to decrease latency. In embodiments, the receivers can reduce latency by reducing the de-jitter buffer size.

The streaming of AV data may be performed according to a screencasting technique, such as a wireless display (WiDi) technique. WiDi is a screencasting technique by which frames to be rendered on a local display of a computing device are rendered on a remote display via a wireless connection. For example, a tablet device may send frames to be rendered at a television instead of on the local display typically included with tablet devices. In embodiments, WiDi may be used for online video playback over a web browser and video chat. Similarly, Miracast is a screencasting certification standard that enables peer-to-peer wireless delivery of audio and video or other screen content between different devices based upon the 802.11 standard.

Figure 2:
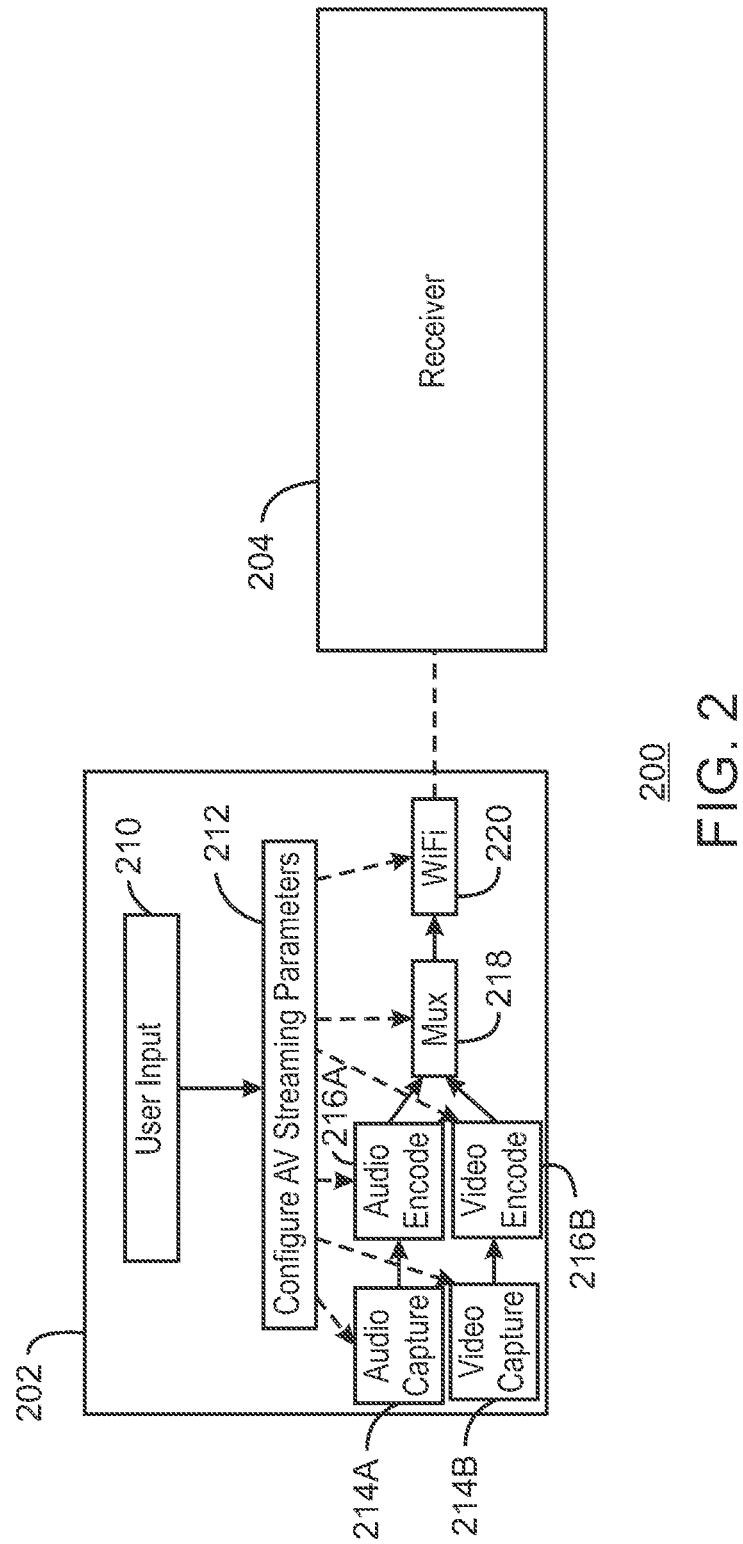
FIG. 2 is an illustration of system that transmits streaming AV data.

FIG. 2 is an illustration of system 200 that transmits streaming AV data. The system 200 includes a transmitter 202 and receiver 204. The transmitter may be a component of a device that is transmitting AV data to a second device that includes the receiver 204. The transmitter 202 captures user input 210. The user input 210 includes user input from input devices such as a keyboard and mouse. User input may also include other forms of input such as sensor based input, microphone, touchscreen, camera, and the like. Sensors may include, but are not limited to, accelerometers, gyrometers, inertial measurement units, and the like.

At block 212, the AV streaming parameters are configured based upon the user input 210. The configured AV streaming parameters are then applied to various stages of AV capture and encoding. In embodiments, various parameters may be configured, such as any parameter that results in AV streaming at a low latency. For example, the parameters to be modified or configured may include multiplexer parameters and WiFi parameters such as buffer size, power consumption limits, and the like.

Each frame may also have a marker embedded into the frame's metadata dependent upon if the frame is an interactive frame. Accordingly, if a gesture is made using the integrated camera then the frame being transmitted can be considered as a user interaction (UX) frame for interaction. In another example, if the device is being moved around while streaming over Miracast, it may be assumed that the user is playing a game which needs low latency and hence the system is set to a low latency interactive mode based upon this detected user input.

At block 214A captures audio and applies the streaming parameters based on the user input to the captured audio. Similarly, block 214B captures video and applies the streaming parameters based on the user input to the captured audio. At block 216A encodes audio and applies the streaming parameters based on the user input to the encoded audio. Similarly, block 214B encodes video and applies the streaming parameters based on the user input to the encoded audio.

A multiplexer 218 combines the encoded audio and video into a data stream. A Wifi connection 220 is used to transmit the encoded audio and video combined to a receiver. The presence of user input would indicate interaction with the system and hence appropriate configuration and modification to AV encode parameters to support low latency streaming. These demand low bitrate, lower resolution and hence lower quality streaming. Illustrated in FIG. 2. Reconfiguration based on user input can be done anywhere within the stack to meet desired streaming parameter setting reconfiguration.

Absence of user input would indicate no interaction of the system with only viewing of the remote screen by the user. As a result low latency would not be a priority leaving room for improvements in bitrate and resolution and hence better AV quality. As illustrated by the dashed lines, reconfiguration based on user input can be done anywhere within the stack to meet desired streaming parameter setting reconfiguration.

Figure 3:
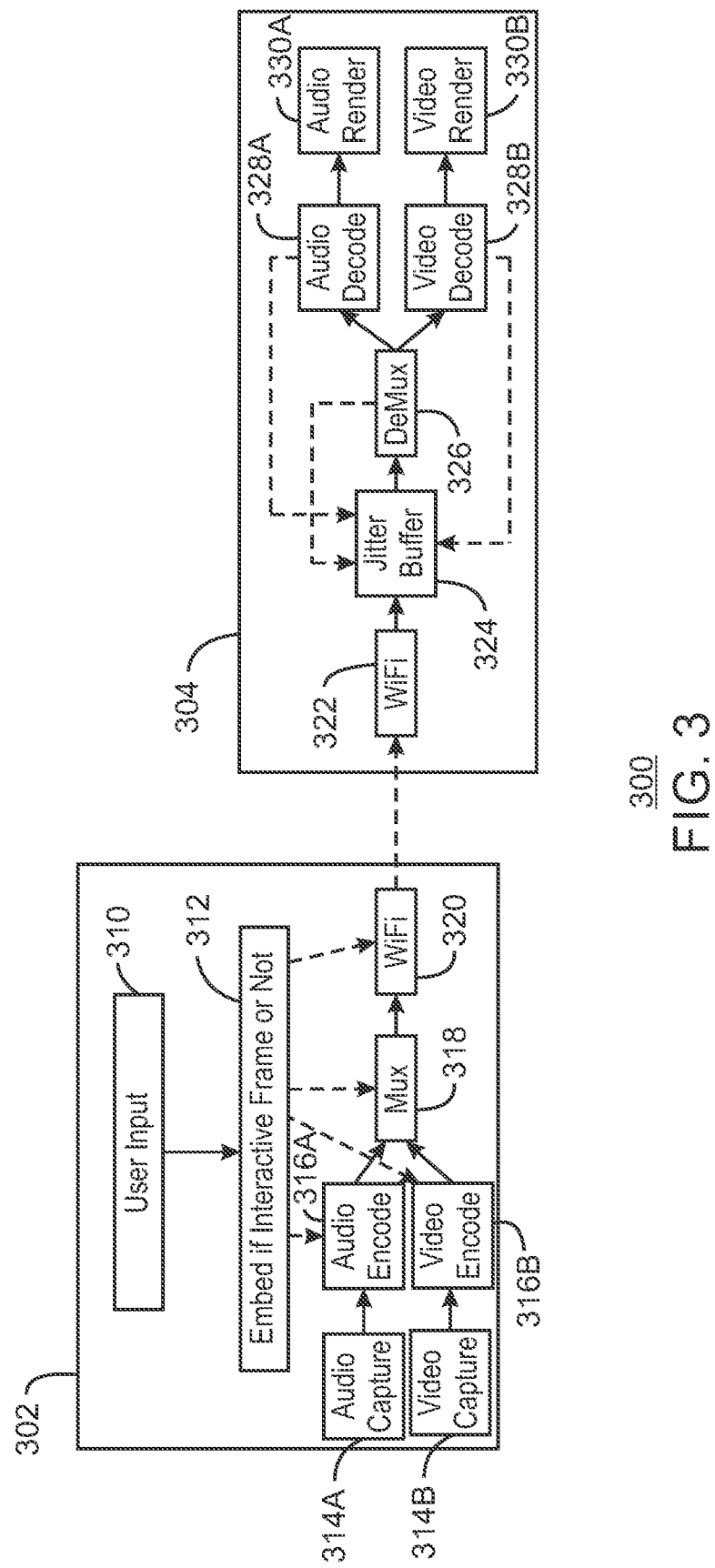
FIG. 3 is an illustration of system that transmits and receives streaming AV data.

FIG. 3 is an illustration of system 300 that transmits and receives streaming AV data. The system 300 includes a transmitter 302 and receiver 304. The transmitter may be a component of a device that is transmitting AV data to a second device that includes the receiver 304. The transmitter 302 captures user input 310.

At block 312, based on the user input 310, each frame may have a marker embedded into the frame's metadata dependent upon if the frame is an interactive frame. The marker may be a flag or any other indication that can be applied on a per-frame basis. Audio input is captured at block 314A, and video input is captured at block 314B. Block 316A encodes audio and applies the frame marker to the audio data. Similarly, block 31bB encodes video and applies the frame marker to the encoded video.

A multiplexer 318 combines the encoded audio and video into a data stream. In embodiments, the multiplexer 318 also embeds the interactive marker in data to be transmitted to the receiver 304. A Wifi connection 320 is used to transmit the encoded audio and video combined to the receiver 304. In the present techniques, the reconfiguration between interactive and quality modes is needed to be made on the receiver. In this case we propose using presence or absence of user input to embed a flag (in metadata) indicating presence or absence of user interaction. On reception of frames that are indicated interactive, the receiver can make appropriate modifications to reduce latency. This can be done by modification of the size of the jitter or dejitter buffer on the receiver. The smaller the buffer, the lower the latency hence improving interaction. However, this may be accompanied by frame drops due to the small jitter buffer size impacting playback quality.

At the receiver 304, transmitted AV data is received by a Wifi block 322. A jitter buffer 324 is to buffer the received data according to latency requirements. A jitter buffer is described here for ease of description. The block that receives data after the Wifi block 322 may be any block used to interpret the modified parameters. For example, at block 324, the various parameters may be applied in order to vary the AV streaming mode from interactive mode to quality mode and vice versa. The parameters include, but are not limited to Wifi parameters (power, receive buffer size), demultiplexer (demux) parameters, and decoder parameters.

In embodiments, on reception of frames that are not marked interactive, the receiver can make appropriate modifications to maintain or increase the latency by increasing the jitter buffer size. This enables smooth playback with minimized dropped frames. Additionally, at block 324, other modifications may be made according to the modified parameters. At block 326, the received data is processed by a demultiplexer 326 that is to separate the audio and video data for further processing. At block 328A, the audio data is decoded. Similarly, at block 328B the video data is decoded. At block 330A, the audio data is rendered, and at block 330B the video data is rendered.

Figure 4:
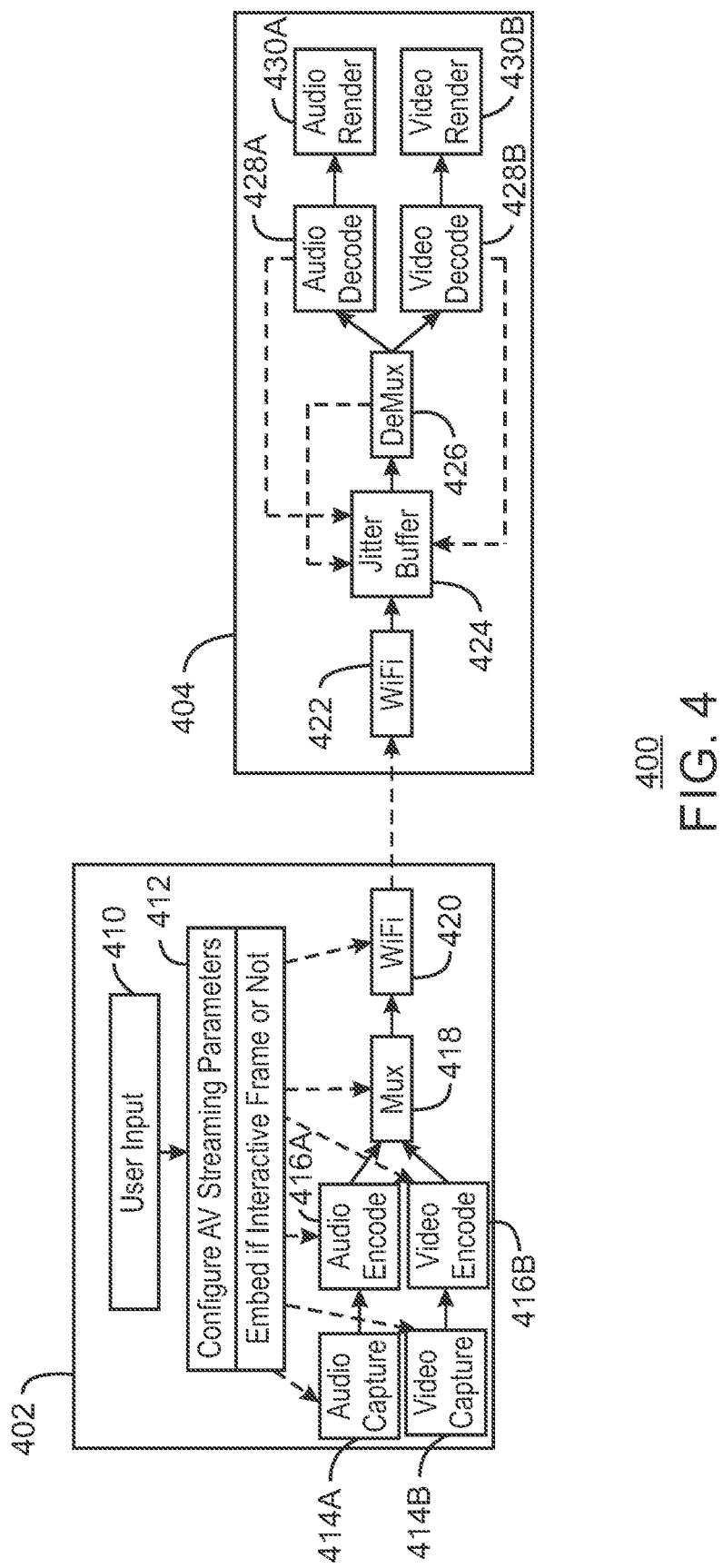
FIG. 4 is an illustration of system that transmits streaming AV data with streaming parameters and interactive frames.

FIG. 4 is an illustration of system 400 that transmits streaming AV data with streaming parameters and interactive frames. The system 400 includes a transmitter 402 and receiver 404. The transmitter may be a component of a device that is transmitting AV data to a second device that includes the receiver 404. The transmitter 402 captures user input 410.

At block 412, the AV streaming parameters are configured based upon the user input 410. The configured AV streaming parameters are then applied to various stages of AV capture and encoding. Additionally, each frame may also have a marker embedded into the frame's metadata dependent upon if the frame is an interactive frame. At block 414A captures audio and applies the streaming parameters based on the user input to the captured audio. Similarly, block 414B captures video and applies the streaming parameters based on the user input to the captured audio. At block 416A encodes audio and applies the streaming parameters based on the user input to the encoded audio. Block 414B encodes video and applies the streaming parameters based on the user input to the encoded audio.

A multiplexer 418 combines the encoded audio and video into a data stream. A Wifi connection 420 is used to transmit the encoded audio and video combined to a receiver. The presence of user input may indicate interaction with the system and hence appropriate configuration and modification to AV encode parameters to support low latency streaming. These demand low bitrate, lower resolution and hence lower quality streaming. As in FIGS. 2 and 3, reconfiguration based on user input can be done anywhere within the stack to meet desired streaming parameter setting reconfiguration. Accordingly, the dashed lines in each figure represent data processing locations where streaming parameters can be modified, and/or a marker can be embedded in active frames. FIG. 4 illustrates interactive and quality modes based on user input with reconfigurations at the transmitter and receiver. This would combine the reconfiguration options described in the two scenarios above.

Figure 5:
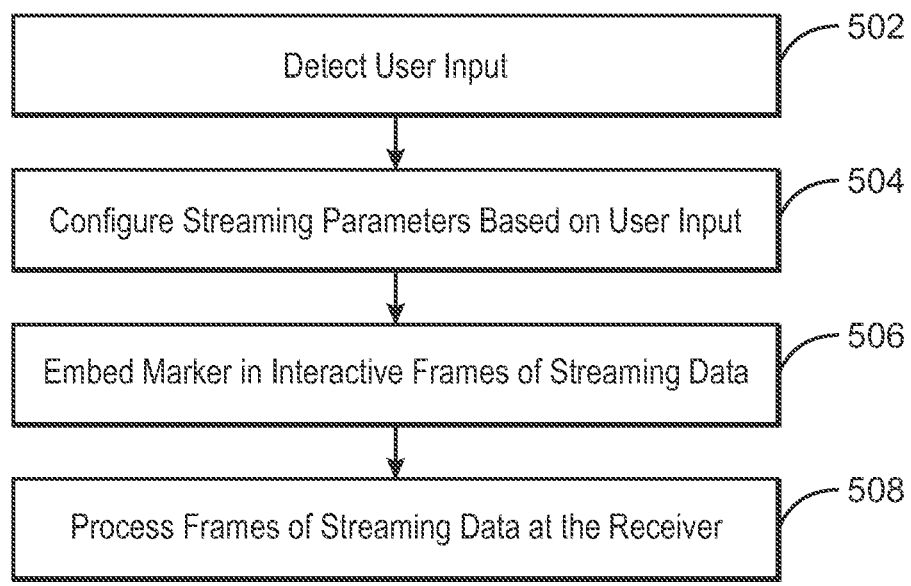
FIG. 5 is a process flow diagram illustrating a method for user input based adaptive streaming.

FIG. 5 is a process flow diagram illustrating a method for user input based adaptive streaming. At block 502, user input may be detected. The user input includes, but is not limited to, user input at an I/O device, user action at the computing device that results in AV feedback, and the like. At block 504, streaming parameters may be configured based on the user input. At block 506, a marker or flag may be embedded in frames of the streaming data. The marker or frame is to indicate if the frame is an interactive frame. The marker or flag can be embedded in the metadata of each frame at any point in the AV streaming pipeline. For example, the marker may be embedded during a data capture operation, encoding, multiplexing, or during streaming to a receiver. At block 508, the frames of data are processed at a receiver. Processing the streaming data at the receiver may include removing jitter via a jitter buffer.

In embodiments, the configuration of the streaming parameters and the interactive frame marker results in a system that becomes more responsive due to user input and possible noticeable improvement in content quality or playback quality during periods of no interaction. However, the present techniques are not limited to only video quality and latency improvements and can be extended to modification of other parameters on the transmitter and receiver. For example, WiFi transmission power on the transmitter, Decode/Encode frequency, and any other power and performance considerations can be modified based on user input at the transmitting device. Consider the use case where the device is operating in quality mode (with no or less user input), the WiFi transmitter power may be increased to ensure that video frames are delivered to the receiver without frame drops or loss of data so that playback is smooth with high quality. The use of screencasting may involve a power intensive process flow that can consume a relatively large portion of the computing device's power. The use of screencasting becomes even more power intensive when the video playback originates from a network source, as is the case when downloading the video stream to the device from a network such as the Internet. The present techniques may be used to mitigate the consumption of power based on the user input and operational modes of the device.

Figure 6:
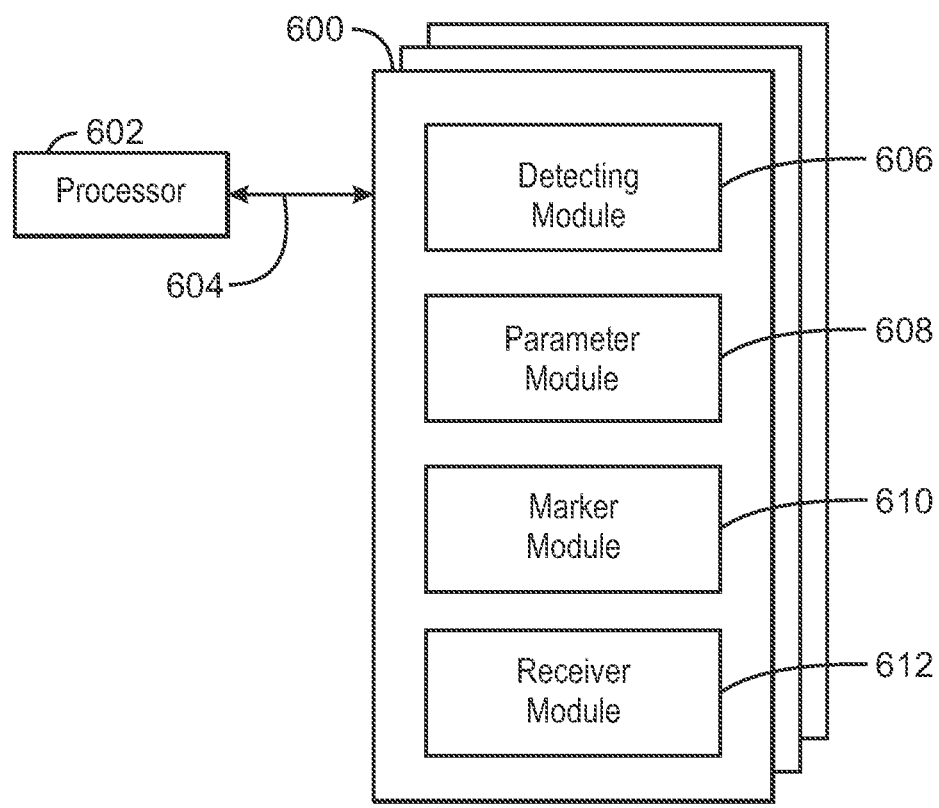
FIG. 6 is a block diagram showing media that contains logic for user input based adaptive streaming.

FIG. 6 is a block diagram showing media 600 that contains logic for user input based adaptive streaming. The media 600 may be a computer-readable medium, including a non-transitory medium that stores code that can be accessed by a processor 602 over a computer bus 604. For example, the computer-readable media 600 can be volatile or non-volatile data storage device. The media 600 can also be a logic unit, such as an Application Specific Integrated Circuit (ASIC), a Field Programmable Gate Array (FPGA), or an arrangement of logic gates implemented in one or more integrated circuits, for example.

The media 600 may include modules 606-612 configured to perform the techniques described herein. For example, a detecting module 606 may be configured to detect user input. A parameter module 608 may be configured to configure streaming parameters based upon the user input. A marker module 610 may be configured to embed a marker in interactive frames. A receiver module 612 may be configured to process frames of streaming data at the receiver. In some embodiments, the modules 607-612 may be modules of computer code configured to direct the operations of the processor 602.

The block diagram of FIG. 6 is not intended to indicate that the media 600 is to include all of the components shown in FIG. 6. Further, the media 600 may include any number of additional components not shown in FIG. 6, depending on the details of the specific implementation.

Example 1 is an apparatus. The apparatus includes a controller to configure a plurality of audio/video streaming parameters based on user input; and an adaptive module to apply the plurality of audio/video streaming parameters to a stream of audio/video data in response to the user input.

Example 2 includes the apparatus of example 1, including or excluding optional features. In this example, the configuration of audio/video parameters results in an instant change in streaming modes.

Example 3 includes the apparatus of any one of examples 1 to 2, including or excluding optional features. In this example, the user input is captured from a keyboard, mouse, a plurality of sensors, microphone, touchscreen, camera, or any combination thereof.

Example 4 includes the apparatus of any one of examples 1 to 3, including or excluding optional features. In this example, the apparatus includes a controller to embed an interactive marker in frames of the audio video data.

Example 5 includes the apparatus of any one of examples 1 to 4, including or excluding optional features. In this example, the plurality of audio/video streaming parameters are applied to a stream of audio/video data in response to the user input while encoding the audio/video data.

Example 6 includes the apparatus of any one of examples 1 to 5, including or excluding optional features. In this example, the plurality of audio/video streaming parameters are applied to a stream of audio/video data in response to the user input when the audio/video data is captured.

Example 7 includes the apparatus of any one of examples 1 to 6, including or excluding optional features. In this example, the plurality of audio/video streaming parameters are applied to a stream of audio/video data in response to the user input when the audio/video data is processed for transmission according to a networking protocol.

Example 8 includes the apparatus of any one of examples 1 to 7, including or excluding optional features. In this example, the plurality of audio/video streaming parameters are applied to a stream of audio/video data in response to the user input at any point during a streaming data pipeline.

Example 9 includes the apparatus of any one of examples 1 to 8, including or excluding optional features. In this example, the plurality of streaming parameters are applied to a stream of audio/video data based on a streaming mode. Optionally, the streaming mode includes a quality mode and an interactive mode.

Example 10 includes the apparatus of any one of examples 1 to 9, including or excluding optional features. In this example, the plurality of audio/video streaming parameters are applied to a stream of audio/video data such that Wi-Fi transmission power is modified based on the user input.

Example 11 is a method for user based adaptive streaming. The method includes detecting user input; configuring streaming parameters based on the user input; and embedding a marker in interactive frames of streaming data in response to user interaction. Optionally, the plurality of streaming parameters are applied to the streaming based on a streaming mode.

Example 12 includes the method of example 11, including or excluding optional features. In this example, the plurality of streaming parameters are applied to the streaming based on a streaming mode.

Example 13 includes the method of examples 11 to 12. In this example, the streaming mode includes a quality mode and an interactive mode.

Example 14 includes the method of examples 11 to 13. In this example, the user input is captured from a keyboard, mouse, a plurality of sensors, microphone, touchscreen, camera, or any combination thereof.

Example 15 includes the method of examples 11 to 14. In this example, the method includes wherein an interactive marker indicates a frame with a high intensity of user input.

Example 16 includes the method of examples 11 to 15. In this example, the streaming parameters are applied to a stream of audio/video data in response to the user input while encoding the audio/video data.

Example 17 includes the method of examples 11 to 16. In this example, the streaming parameters are applied to a stream of audio/video data in response to the user input when a stream of audio/video data is captured.

Example 18 includes the method of examples 11 to 17. In this example, the streaming parameters are applied to a stream of audio/video data in response to the user input when the audio/video data is processed for transmission according to a networking protocol.

Example 19 includes the method of examples 11 to 18. In this example, the streaming parameters are applied to a stream of audio/video data in response to the user input at any point during a streaming data pipeline.

Example 20 includes the method of examples 11 to 19. In this example, the streaming parameters are applied to a stream of audio/video data such that Wi-Fi transmission power is modified based on the user input.

Example 21 is a computer-readable medium. The computer-readable medium includes instructions that direct the processor to detect user input; configure streaming parameters based on the user input; and embed a marker in interactive frames of streaming data in response to user interaction. Optionally, the plurality of streaming parameters are applied to the streaming based on a streaming mode.

Example 22 includes the computer-readable medium of example 21, including or excluding optional features. In this example, the streaming mode includes a quality mode and an interactive mode.

Example 23 includes the computer-readable medium of examples 21 or 22. In this example, the user input is captured from a keyboard, mouse, a plurality of sensors, microphone, touchscreen, camera, or any combination thereof.

Example 24 includes the computer-readable medium of any of examples 21 to 23. In this example, the computer-readable medium includes wherein an interactive marker indicates a frame with a high intensity of user input.

Example 25 includes the computer-readable medium of any of examples 21 to 24. In this example, the streaming parameters are applied to a stream of audio/video data in response to the user input while encoding the audio/video data.

Example 26 includes the computer-readable medium of any of examples 21 to 25. In this example, the streaming parameters are applied to a stream of audio/video data in response to the user input when a stream of audio/video data is captured.

Example 27 includes the computer-readable medium of any of examples 21 to 26. In this example, the streaming parameters are applied to a stream of audio/video data in response to the user input when the audio/video data is processed for transmission according to a networking protocol.

Example 28 includes the computer-readable medium of any of examples 21 to 27. In this example, the streaming parameters are applied to a stream of audio/video data in response to the user input at any point during a streaming data pipeline.

Example 29 includes the computer-readable medium of any of examples 21 to 28. In this example, the streaming parameters are applied to a stream of audio/video data such that Wi-Fi transmission power is modified based on the user input.

Example 30 is a system that includes a conditional end of thread mechanism. The system includes instructions that direct the processor to a display; a radio; a memory that is to store instructions and that is communicatively coupled to the display; and a processor communicatively coupled to the radio and the memory, wherein when the processor is to execute the instructions, the processor is to: configure a plurality of audio/video streaming parameters based on user input; and apply the plurality of audio/video streaming parameters to a stream of audio/video data in response to the user input.

Example 31 includes the system of examples 30. In this example, the user input is captured from a keyboard, mouse, a plurality of sensors, microphone, touchscreen, camera, or any combination thereof.

Example 32 includes the system of any of examples 30 to 31. In this example, the audio/video streaming parameters are configured based on an intensity of user interaction.

Example 33 includes the system of any of examples 30 to 32. In this example, the configuration of audio/video parameters results in an instant change in streaming modes.

Example 34 includes the system of any of examples 30 to 33. In this example, the plurality of audio/video streaming parameters are applied to a stream of audio/video data in response to the user input when the audio/video data is captured.

Example 35 includes the system of any of examples 30 to 34. In this example, the plurality of audio/video streaming parameters are applied to a stream of audio/video data in response to the user input when the audio/video data is processed for transmission according to a networking protocol.

Example 36 includes the system of any of examples 30 to 35. In this example, the plurality of audio/video streaming parameters are applied to a stream of audio/video data in response to the user input at any point during a streaming data pipeline.

Example 37 includes the system of any of examples 30 to 36. In this example, the plurality of streaming parameters are applied to a stream of audio/video data based on a streaming mode.

Example 38 includes the system of any of examples 30 to 37. In this example, the streaming mode includes a quality mode and an interactive mode.

Example 39 includes the system of any of examples 30 to 38. In this example, the plurality of audio/video streaming parameters are applied to a stream of audio/video data such that Wi-Fi transmission power is modified based on the user input.

Example 40 is an apparatus. The apparatus includes instructions that direct the processor to a means to configure a plurality of audio/video streaming parameters based on user input; and an adaptive module to apply the plurality of audio/video streaming parameters to a stream of audio/video data in response to the user input.

Example 41 includes the apparatus of example 40. In this example, the configuration of audio/video parameters results in an instant change in streaming modes.

Example 42 includes the apparatus of any of examples 40 and 41. In this example, the user input is captured from a keyboard, mouse, a plurality of sensors, microphone, touchscreen, camera, or any combination thereof.

Example 43 includes the apparatus of any of examples 40 to 42. In this example, the apparatus includes a means to embed an interactive marker in frames of the audio video data.

Example 44 includes the apparatus of any of examples 40 to 43. In this example, the plurality of audio/video streaming parameters are applied to a stream of audio/video data in response to the user input while encoding the audio/video data.

Example 45 includes the apparatus of any of examples 40 to 44. In this example, the plurality of audio/video streaming parameters are applied to a stream of audio/video data in response to the user input when the audio/video data is captured.

Example 46 includes the apparatus of any of examples 40 to 45. In this example, the plurality of audio/video streaming parameters are applied to a stream of audio/video data in response to the user input when the audio/video data is processed for transmission according to a networking protocol.

Example 47 includes the apparatus of any of examples 40 to 46. In this example, the plurality of audio/video streaming parameters are applied to a stream of audio/video data in response to the user input at any point during a streaming data pipeline.

Example 48 includes the apparatus of any of examples 40 to 47. In this example, the plurality of streaming parameters are applied to a stream of audio/video data based on a streaming mode.

Example 49 includes the apparatus of any of examples 40 to 48. In this example, the streaming mode includes a quality mode and an interactive mode.

Example 50 includes the apparatus of any of examples 40 to 49. In this example, the plurality of audio/video streaming parameters are applied to a stream of audio/video data such that Wi-Fi transmission power is modified based on the user input.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A method for adaptive streaming, the method performed by a first electronic device, and the method comprising:

detecting, by executing an instruction with at least one processor of the first electronic device, a user input data from an input device, the user input data corresponding to a user interaction and an intensity of the user interaction, the intensity of the user interaction based on a quantity of the user input data detected during an amount of time, and the user input data corresponding to an audio/video stream being streamed from the first electronic device to a second electronic device in accordance with a screencasting technique, the second electronic device remote from the first electronic device;

and at least one of (A) modifying, by executing an instruction with at least one processor of the first electronic device, based on the intensity of the user interaction, a latency parameter of the audio/video stream from a first value to a second value, the modification of the latency parameter to occur by at least one of (i) a first modification of a multiplexer parameter of a multiplexer of the first electronic device, (ii) a second modification of a Wifi parameter used by the first electronic device to stream the audio/video stream, or (iii) a third modification of a power consumption limit of the first electronic device, the first, second, and third modifications to affect a latency at which the audio/video stream is streamed from the first electronic device to the second electronic device for display at the second electronic device, or (B) embedding, by executing an instruction with the at least one processor of the first electronic device, interactive markers in respective audio/video frames of the audio/video stream determined to correspond to the user interaction, wherein the interactive markers indicate to the second electronic device that the respective audio/video frames having the interactive markers are to be processed by the second electronic device using the second value of the latency parameter.

2. The method of claim 1, wherein adjusting the latency parameter affects a streaming mode of the first electronic device.

3. The method of claim 2, wherein the streaming mode corresponds to at least one of a quality mode or an interactive mode.

4. The method of claim 1, wherein the user input data is captured from a keyboard, mouse, a plurality of sensors, a microphone, a touchscreen, or a camera, or any combination thereof.

5. The method of claim 1, wherein the interactive markers are embedded in the respective audio/video frames determined to correspond to the intensity of the user interaction being greater than a pre-defined threshold.

6. The method of claim 1, wherein the modified latency parameter is applied to the audio/video stream while encoding audio/video data associated with the audio/video stream.

7. The method of claim 1, wherein the latency parameter is modified at any of various stages of audio/video capture and encoding performed at the first electronic device.

8. A computer-readable storage device comprising instructions that, when executed, cause at least one processor of a first electronic device to at least:
  detect a user input corresponding to a user interaction and an intensity of the user interaction, the intensity of the user interaction corresponding to an amount of user input data detected during an amount of time;
  identify a value of a latency parameter to be applied to an audio/video stream corresponding to the user input, the value of the latency parameter identified based on the intensity of the user interaction, and the audio/video stream being streamed from the first electronic device to a second electronic device according to a screencasting standard; and
  at least one of (A) apply the value of the latency parameter to the audio/video stream, application of the value of the latency parameter to occur by at least one of (i) a first application of a multiplexer parameter of a multiplexer of the first electronic device, (ii) a second application of a Wifi parameter used by the first electronic device to stream the audio/video stream, or (iii) a third application of a power consumption limit of the first electronic device, the at least one of the first, second, or third applications to affect a latency at which the audio/video stream is streamed to the second electronic device, or (B) embed interactive markers in respective audio/video frames of the audio/video stream determined to correspond to the user interaction, the interactive markers to indicate the value of the latency parameter is to be applied to the respective audio/video frames of the streaming data by the second electronic device.

9. The computer-readable storage device of claim 8, wherein the latency parameter applied to the audio/video stream affects a streaming mode of the first electronic device.

10. The computer-readable storage device of claim 9, wherein the streaming mode corresponds to at least one of a quality mode and an interactive mode.

11. The computer-readable storage device of claim 8, wherein the user input data is captured from a keyboard, mouse, a plurality of sensors, a microphone, a touchscreen, or a camera, or any combination thereof.

12. A first electronic device, comprising:
  memory; and
  processor circuitry to execute computer readable instructions to:
    identify a first value of a latency parameter of an audio/video stream being streamed according to a screencasting standard from the first electronic device to a second electronic device, the first electronic device remote from the second electronic device, and the first value to be identified in response to detecting user input data associated with the audio/video stream, the user input data corresponding to a user interaction and an intensity of the user interaction, the user input data from one or more input devices, and the intensity of the user interaction based on a quantity of the user input data detected during an amount of time;
    identify a second value of the latency parameter of the audio/video stream, the second value of the latency parameter based on a comparison of the intensity of the user interaction to a threshold value; and
    at least one of (A) modify the latency parameter of the audio/video stream from the first value to the second value, modification of the latency parameter to occur by at least one of (i) a first modification of a multiplexer parameter of a multiplexer of the first electronic device, (ii) a second modification of a Wifi parameter used by the first electronic device to stream the audio/video stream, or (iii) a third modification of a power consumption limit of the first electronic device, the first, second and third modifications to affect a latency at which the audio/video stream is streamed to the second electronic device, or (B) embed interactive markers in respective frames of the audio/video stream corresponding to the user interaction, the interactive markers to be used by the second electronic device to identify frames of the audio/video stream to be processed using the second value of the latency parameter.

13. The first electronic device of claim 12, wherein modification of the first value of the latency parameter to the second value causes a change in a streaming mode from a first mode to a second mode in real time.

14. The first electronic device of claim 12, wherein the processor circuitry is to encode the audio/video data of the audio/video stream.

15. The first electronic device of claim 12, wherein the processor circuitry is to apply the modified latency parameter to the audio/video stream at any of various stages of audio/video capture and encoding performed at the first electronic device.

16. The first electronic device of claim 12, wherein the processor circuitry is to apply the modified latency parameter to the audio/video stream when audio/video data of the audio/video stream is processed for transmission from the first electronic device to the second electronic device.

17. The first electronic device of claim 12, wherein the modified latency parameter affects a streaming mode used to stream the audio/video stream to the second electronic device.

18. The first electronic device of claim 17, wherein the streaming mode corresponds to at least one of a quality mode and an interactive mode.

19. A system, comprising:
- a display of a first electronic device;
- a radio;
- memory; and
- a processor of a second electronic device communicatively coupled to the radio and the memory, the processor to execute instructions to:
- identify a first value of a latency parameter of an audio/video stream being streamed by the radio, in accordance with a screencasting standard, from the second electronic device to the display of the first electronic device, the second electronic device remote from the first electronic device, and the first value to be identified in response to detecting user input data associated with the audio/video stream, the user input data corresponding to a user interaction and an intensity of the user interaction, the intensity of the user interaction based on an amount of the user input data detected during an amount of time;
- identify a second value of the latency parameter of the audio/video stream, the second value of the latency parameter based on a comparison of the intensity of the user interaction to a threshold value; and
- at least one of (A) modify the latency parameter from the first value to the second value, modification of the latency parameter to occur by at least one of (i) a first modification of a multiplexer parameter of a multiplexer of the second electronic device, (ii) a second modification of a Wifi parameter used by the second electronic device to stream the audio/video stream, or (iii) a third modification of a power consumption limit of the second electronic device, the first, second, and third modifications to affect a latency at which the audio/video stream is streamed to the first electronic device; or (B) embed interactive markers in respective frames of the audio/video stream determined to correspond to the user interaction, the interactive markers to be used by the first electronic device to identify the respective frames of the audio/video stream to be processed using the second value of the latency parameter.

20. The system of claim 19, wherein the user input is captured from a keyboard, a mouse, a plurality of sensors, a microphone, a touchscreen, or a camera, or any combination thereof.

21. The system of claim 19, wherein the amount of the user input data detected during the amount of time corresponds to a number of keystrokes per second.

22. The system of claim 19, wherein usage of the second value of the latency parameter by the second electronic device causes a change in a streaming mode of the second electronic device in real time.

* * * * *